United States Patent [19]

Ishikawa et al.

[11] Patent Number: 5,061,333

[45] Date of Patent: Oct. 29, 1991

[54] PROCESS FOR PRODUCING A LAMINATE

[75] Inventors: Kenichi Ishikawa; Koji Kurita, both of Yokohama, Japan

[73] Assignee: Asahi Glass Company, Ltd., Tokyo, Japan

[21] Appl. No.: 836,161

[22] Filed: Mar. 4, 1986

[30] Foreign Application Priority Data

Mar. 14, 1985 [JP] Japan .................................. 60-51271

[51] Int. Cl.$^5$ ............................................. B32B 35/00
[52] U.S. Cl. .................... 156/213; 156/267; 156/285; 156/286; 156/382
[58] Field of Search ............... 156/285, 286, 213, 267, 156/306.6, 319, 320, 382, 104

[56] References Cited

U.S. PATENT DOCUMENTS

| 2,201,706 | 5/1940 | Sukohl | 156/160 |
| 2,309,865 | 2/1943 | Reach | 156/147 |
| 3,042,574 | 6/1962 | Hochberg | 156/286 |
| 3,130,101 | 4/1964 | Gittins | 156/213 |
| 3,322,598 | 5/1967 | Marks | 156/285 |
| 3,769,133 | 10/1973 | Halberschmidt | 156/382 |
| 4,241,140 | 12/1980 | Ammons | 156/306.6 |

FOREIGN PATENT DOCUMENTS

| 0026140 | 4/1981 | European Pat. Off. |  |
| 1226691 | 7/1960 | France |  |
| 0963956 | 7/1964 | United Kingdom | 156/286 |

OTHER PUBLICATIONS

Patent Abstracts of Japan, vol. 10, No. 59, Abstract of JP-A-60-206622, Oct. 18, 1985.

Primary Examiner—Jenna Davis
Attorney, Agent, or Firm—Oblon, Spivak, McClelland, Maier & Neustadt

[57] ABSTRACT

A process for producing a laminate comprising a sheet material and a plastic film laminated on at least one side of the sheet material, which comprises vacuum-packaging the sheet material by a vacuum packaging film material, of which at least the portion corresponding to said side of the sheet material is made of a plastic film to be laminated on the sheet material, press-bonding the plastic film to the sheet material, and removing the film material from the sheet material except for the plastic film portion laminated on the sheet material.

4 Claims, 3 Drawing Sheets

PROCESS FOR PRODUCING A LAMINATE

The present invention relates to a process for producing a laminate.

For the production of a laminated glass comprising two glass sheets bonded by an interlayer, a process is known wherein a rubber bag for preliminary press-bonding is employed. In this process, a laminate comprising two glass sheets and an interlayer sandwiched therebetween is inserted into a rubber bag for preliminary press-bonding, and the bag is vacuumed and heated for heat press-bonding the glass sheets and the interlayer. However, it has been found that when the above-mentioned process employing a rubber bag for preliminary press-bonding is used for the production of a laminated safety glass in which a plastic film is bonded to a glass sheet, there will be a serious problem such that the irregularities or wrinkles on the inner surface of the rubber bag for preliminary press-bonding are likely to transfer to the plastic film, and the resulting safety glass will be defective. As an improved process for the preparation of the safety glass, there has been proposed a process which comprises overlaying a cover glass sheet having the same shape as the safety glass to be produced, on the plastic film of the laminate comprising a glass sheet and the plastic film, heat press-bonding the glass sheet and the plastic film by means of e.g. a rubber bag for preliminary press-bonding, and then removing the cover glass sheet to obtain a safety glass of the above-mentioned type in Japanese Unexamined Patent Publication No. 194533/1983 or No. 194534/1983. According to this process, it is possible to heat press-bond a thermoplastic resin film to a glass sheet. However, in the case of a thermosetting resin film, there is a drawback that cavities are likely to form by the influence of dusts present at the interface. Therefore, a high level of a dust-free chamber is required. Further, the yield tends to be poor due to inadequate releasing effects when the cover glass sheet is removed.

Further, the present applicants have proposed in Japanese Patent Application No. 255037/1984 a process for producing a safety glass of the above-mentioned resin-laminated type from a conventional laminated glass by means of a vacuum packaging bag and a vacuum packaging apparatus. This process comprises inserting a laminate into a vacuum packaging bag, vacuuming the bag by evacuating a vacuum chamber, heat-sealing the opening of the vacuum packaging bag, heating the entire vacuum packaging bag to a predetermined temperature to heat press-bond the laminate. According to this process, a good product can be obtained when a glass sheet or a hard plastic film is placed on the surface. However, when a soft plastic film susceptible to damages is placed on the surface, the plastic film is likely to undergo a deformation, and the see-through distortion is likely to result. Japanese Examined Patent Publication No. 12140/1983 discloses another process for the production of a laminate of this type. According to this process, a plastic film to be laminated on a sheet material is placed on an inflatable diaphragm, the periphery of which is secured in a vacuum chamber, and the sheet material is disposed horizontally with its surface facing the plastic film. Then, the diaphragm is inflated by controlling the pressure at both sides of the diaphragm so that the plastic film is pressed against the surface of the sheet material, and the plastic film is press-bonded to the sheet material.

However, in this process, the plastic film to be laminated is preliminarily cut into a shape corresponding to the shape of the sheet material. It is extremely difficult to accurately position the cut plastic film relative to the sheet material for press-bonding. It is especially difficult to accurately press-bond the plastic film to the surface of a curved sheet material. Further, according to this process, the press-bonding of the plastic film to the sheet material is required to be completed in the vacuum chamber, and it is not possible to firmly bond the plastic film to the sheet material under high pressure by means of an autoclave. Further, the inflatable diaphragm is made of e.g. a silicone rubber film. Due to the surface roughness of this film or due to dusts deposited on the surface, it is likely that the plastic film surface will be defective.

For the production of a laminate having a plastic film laminated on at least one side of a sheet material, particularly for the production of a laminate for a safety glass having a plastic film laminated on at least one side of a glass sheet, it is an object of the present invention to provide a process for producing a laminate of good quality without bringing about various defects such as irregularities, wrinkles, scars, deformations or see-through distortions to the plastic film.

The present invention has been accomplished as a result of a study with the above object, and it provides a process for producing a laminate comprising a sheet material, that is, a sheet layer, and a plastic film laminated on at least one side of the sheet material, which comprises vacuum packaging the sheet material by a vacuum packaging film material, of which at least the portion corresponding to said side of the sheet material is made of a plastic film to be laminated on the sheet material, press-bonding the plastic film to the sheet material, and removing the vacuum packaging film material from the sheet material except for the plastic film portion laminated on the sheet material.

Now, the present invention will be described in detail with reference to the preferred embodiments.

In the accompanying drawings.

FIGS. 1 to 5 are schematic illustrations of the constructions of various laminates 1 prepared by the present invention.

Figure 1:
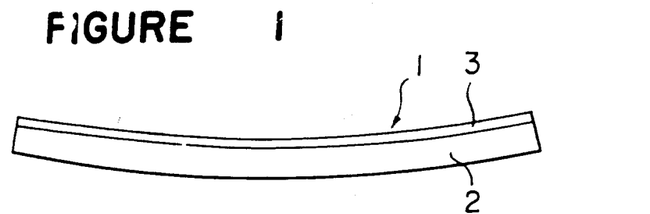
FIGS. 1 to 5 are cross-sectional views of various types of laminates produced in accordance with the present invention.

FIG. 1 is a cross-sectional view of a laminate 1 wherein a plastic film 3 is laminated on one side of a sheet material 2.

Figure 2:
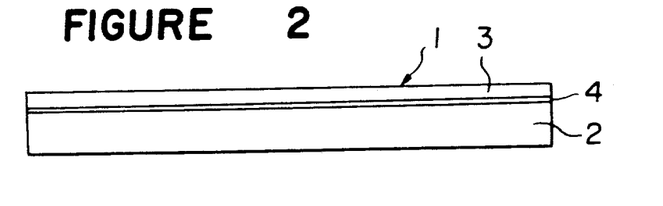

FIG. 2 is a cross-sectional view of a laminate 1 wherein a plastic film 3 is laminated on one side of a sheet material 2 with an adhesive layer 4 interposed therebetween.

Figure 3:
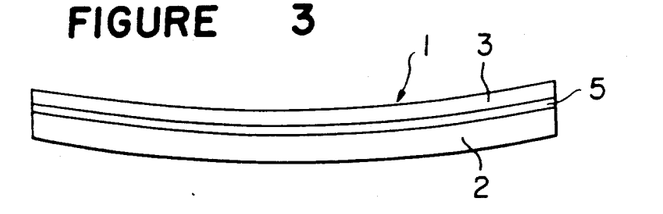

FIG. 3 is a cross-sectional view of a laminate 1 wherein a plastic film 3 is laminated on one side of a sheet material 2 with an adhesive interlayer 5 interposed therebetween.

Figure 4:
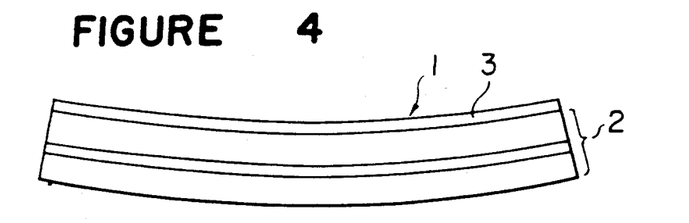

FIG. 4 is a cross-sectional view of a laminate 1 wherein a plastic film 3 is laminated on one side of a laminated sheet material 2.

Figure 5:
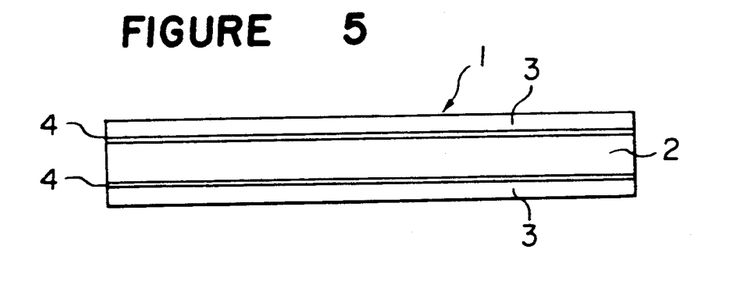

FIG. 5 is a cross-sectional view of a laminate 1 wherein a plastic film 3 is laminated on each side of a sheet material 2 with an adhesive layer 4 interposed therebetween.

The sheet material 2 in the present invention is the substrate on which a plastic film is laminated. An inorganic glass sheet or a plastic sheet made of a polycarbonate, an acrylic resin or various other plastics, may be mentioned as typical examples. However, the sheet material is of course not restricted to these examples. There is no particular restriction also as to the shape of the sheet material 2.

As the plastic film 3, various plastic films may be employed depending upon the particular purposes, for instance, a thermoplastic film, a thermosetting film, a laminated plastic film composed of a plurality of layers of thermoplastic and thermosetting films, a plastic film having an adhesive layer 4 formed on the side to be laminated onto the sheet material 2, or plastic films subjected to various treatments. The thickness of the plastic film is not critical, but is usually from 0.3 to 2.5 mm.

A representative example of the laminate of the present invention is a safety glass wherein the sheet material is a transparent glass sheet and a plastic film is laminated on the glass sheet to improve the safety in case of the breakage of the glass sheet. Such a safety glass is useful for automobiles, railway vehicles, ships, aircrafts or other various transportation vehicles, or for construction or building purposes, or for various apparatus. In such a safety glass, the plastic film is transparent and has a function to minimize the damages to the skin in case of the breakage of the glass sheet upon collision and a function to provide penetration resistance, abrasion resistance, etc. As typical examples, there may be mentioned, for instance, a laminated plastic film comprising a polyethylene terephthalate film, a nylon film or a self-healing type thermosetting polyurethane film and an adhesive interlayer such as polyvinyl butyral or an ethylene-vinyl acetate copolymer; a plastic film such as a polyethylene terephthalate film, a nylon film or a self-healing type thermosetting urethane film, having an adhesive layer on the side to be bonded to the glass sheet; a single layered or double layered polyurethane film such as a plastic film having a thermoplastic urethane layer on the side to be bonded to the glass sheet and a self-healing type thermosetting urethane layer on the other side; or a plastic film of a thermoplastic urethane having the surface reformed.

It is most preferred to have the entire surface of the plastic film to be bonded to the sheet material, embossed to facilitate and ensure adequate deaeration for preliminary press-bonding or final press-bonding. Such embosses preferably have a depth of from 0.1 to 5 $\mu$m, more preferably from 1.0 to 2.5 $\mu$m. Further, various treatments such as corona discharge treatment may be applied to improve the adhesion of the film constituting the plastic film.

The glass sheet for the above-mentioned safety glass may be subjected to bending treatment or reinforcing treatment, or may be provided partially or entirely with a transparent surface coating, a translucent coating or an opaque surface coating such as a conductive coating, a heat ray reflecting coating, a color coating or a hard coating. The thickness of the glass sheet is usually from 1.0 to 20 mm, particularly from 2 to 6 mm for automobiles.

For the production of a laminate according to the present invention, a vacuum packaging film material is used which is designed to enclose the sheet material by vacuum packaging. At least the portion of the film material corresponding to the lamination side of the sheet material is made of a plastic film to be laminated on the sheet material. Namely, the vacuum packaging film material comprises a pair of plastic films to be laminated on the sheet material, or it comprises a sheet of a plastic film and a sheet of a film other than the plastic film. In a preferred embodiment of the invention, the vacuum packaging film material is in the form of a bag. In this case, the vacuum packaging is conducted by inserting the sheet material in the bag, vacuuming the bag and sealing the vacuumed bag to obtain a vacuum-packaged sheet material. The entire bag may be made of the plastic film to be laminated. Otherwise, the bag may have one side made of the plastic film to be laminated on the sheet material and the other side made of a film other than the plastic film. Here, the term "a film other than the plastic film" includes a plastic film or flexible sheet made of a material different from the material of the plastic sheet to be laminated on the sheet material. It is further possible to prepare the portion of the bag to be laminated on the sheet material from the plastic film to be laminated and the rest of the bag from a film other than the plastic film to be laminated on the sheet material.

As such a film other than the plastic film to be laminated on the sheet material, there may be employed a single or multi-layered plastic film or flexible plastic sheet. Such a film is preferably made of a material which has adequate heat resistance not to melt or soften at a temperature of heating e.g. at a level of from 50° to 50° C. when the preliminarily press-bonded vacuum-packaged sheet material is subjected to heat treatment or hot-pressing for the final press-bonding in a heating chamber or in an autoclave without taking out the sheet material from the bag.

Such a material is preferably the one capable of establishing a hermetical sealing by thermal fusion or adhesion with the plastic film constituting the laminate. For instance, in the case where the sealing after the evacuation is conducted by heat sealing, there may be employed, for instance, a single layered thermoplastic film made of e.g. polyethylene, polypropylene, nylon, polyurethane, a vinyl chloride resin or an ethylene-vinyl acetate copolymer or a double-layered type comprising such a plastic film at the inner side to be subjected to heat sealing and a nylon film or a polyethylene terephthalate film at the outer side as typical examples. However, the material is not restricted to such specific examples. In the case where the sealing after the evacuation of the bag is conducted by heat sealing, the entire or at least the opening portion of the bag is made of a heat sealable or hot meltable material. Further, the opening of the vacuum packaging bag may be made sealable by an application of heat or by using an adhesive or tacky material at the contacting surfaces of the sealing portion of the opening of the bag.

Figure 6:
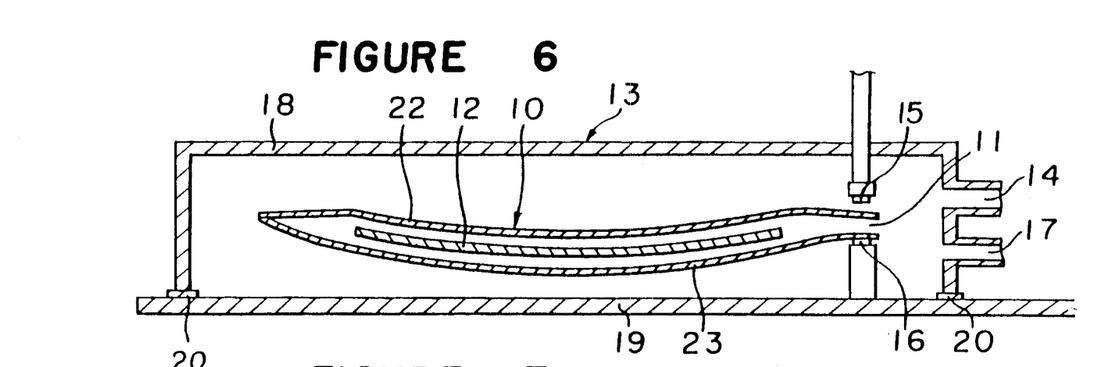
FIGS. 6 to 8 illustrate a lamination apparatus useful for carring out the process of the present invention.
Figure 7:
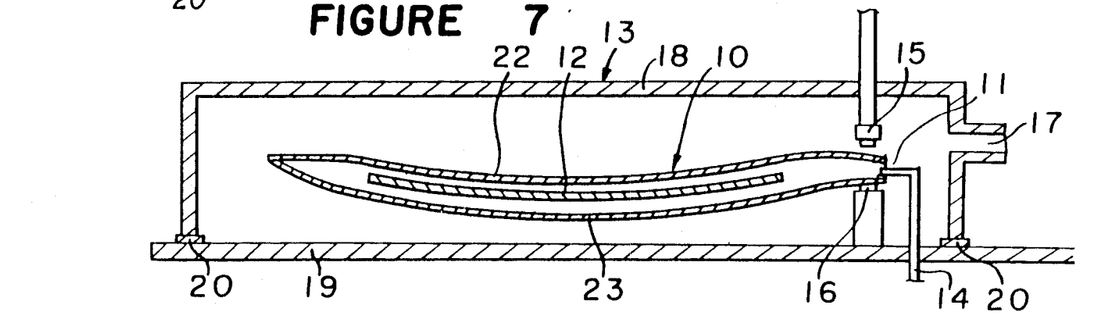
Figure 8:
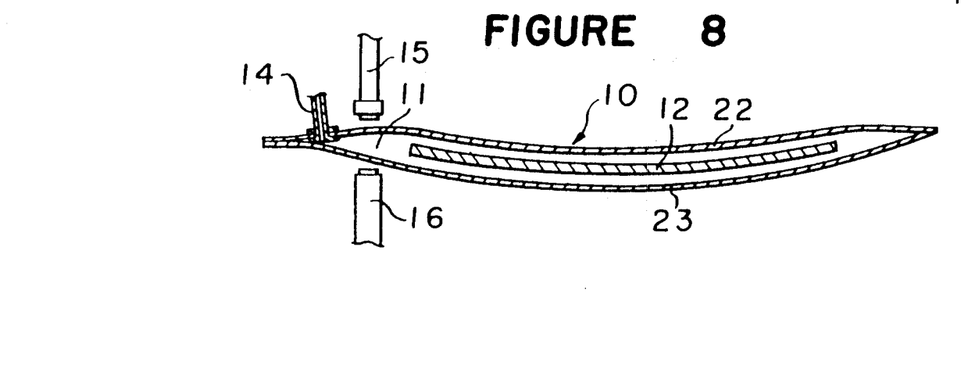

There is no particular restriction as to the shape of the bag. The shape is appropriately selected depending upon the shape of the laminate to be prepared. For instance, it is convenient to use a bag having one side made of a plastic film to be laminated on the sheet material and the other side made of the same plastic film or a film other than such a plastic film, and among the four peripheral sides, two or three sides are preliminarily sealed to form an envelope. The vacuum packaging bag illustrated in FIGS. 6 to 8 is an envelope type having an opening end along one side. With this type, the sealing operation can readily be made simply by heat sealing only one side.

Further, the vacuum packaging bag may be formed by placing the sheet material between a pair of films and sealing the periphery of the films to form an envelope containing the sheet material and having an opening.

The process for the production of laminates according to the present invention will be described with respect to a case where the sheet material is a glass sheet. Firstly, a glass sheet of single plate type or laminated glass type thoroughly washed, dried and cleaned for lamination, is inserted into a vacuum packaging bag so that the plastic film side of the bag to be laminated on the sheet material faces the side of the sheet material on which the plastic film is to be laminated. The vacuum packaging bag, particularly the inner side to be laminated on the glass sheet, is also thoroughly washed, dried and cleaned. In order to avoid insufficient press-bonding of the plastic film to the glass sheet, an adhesive interlayer may be provided on the lamination side of the glass sheet, or an adhesive layer may be formed on the lamination side of the glass sheet.

After the insertion of the glass sheet into the vacuum packaging bag, the bag is vacuumed to evacuate the interior and to conduct the preliminary press-bonding, and then the vacuumed bag is preferably sealed. This vacuuming step is conducted preferably at a temperature of not higher than 40° C., more preferably not higher than 20° C., whereby the deaeration can efficiently be carried out, and the see-through distorsion due to the formation of an air layer at the interface between the film and glass by inadequate deaeration can be minimized.

As shown in FIG. 6, such a vacuum packaging step can be conducted by inserting a sheet material 12 into a vacuum packaging bag 10, of which at least the sealing portion in the vicinity of the opening 11 of the bag 10 is heat sealable, placing the vacuum packaging bag 10 in a vacuum chamber 13, or by inserting a sheet material 12 into such a vacuum packaging bag 10 which is placed in a vacuum chamber 13, maintaining the opening of the bag 10 to be open by a suitable means, then vacuuming the vacuum chamber 13 by a vacuuming pipe 14 to evacuate the vacuum chamber 13 and the vacuum packaging bag 10, then heat sealing the opening 11 of the vacuum packaging bag 10 by heat sealing members 15 and 16 to seal the bag 10. Alternatively, as shown in FIG. 7, the vacuum packaging can be conducted by inserting a sheet material 12 into a vacuum packaging bag 10, of which at least the opening portion 11 is heat sealable, then placing the vacuum packaging bag 10 in a vacuum chamber 13, or by inserting a sheet material 12 into such a vacuum packaging bag 10 placed in a vacuum chamber 13, maintaining the opening of the bag 10 to be open by a suitable means, then vacuuming the vacuum chamber 13 and the vacuum packaging bag 10 by a pipe 17 for the vacuuming chamber and a vacuuming pipe 14 for the vacuum packaging bag 10 to evacuate the vacuum chamber 13 and the vacuum packaging bag 10, and then heat sealing the opening portion 11 of the vacuum packaging bag 10 by heat sealing members 15 and 16 to seal the vacuum packaging bag 10. Otherwise, as shown in FIG. 8, the vacuum packaging can be conducted also by inserting a sheet material 12 into a vacuum packaging bag 10, of which at least the opening portion 11 is heat sealable, then connecting a vacuuming pipe 14 to a vacuuming pipe inlet of the vacuum packaging bag 10 without placing it in a vacuum chamber, vacuuming the bag 10 by the pipe 14, and then heat sealing the opening portion 11 of the bag 10 by heat sealing members 15 and 16 to seal the vacuum packaging bag 10. After sealing the vacuumed bag containing the sheet material, in the vacuum chamber, the atmospheric air is introduced into the vacuum chamber by the pipe 17 to release the vacuum, and then the vacuum-packaged bag 10 containing the sheet material is taken out from the vacuum chamber.

The temperature for the step of vacuuming the vacuum packaging bag for preliminary press-bonding is preferably not higher than 40° C., more preferably not higher than 20° C.

In the embodiments shown in FIGS. 6 to 8, the sealing of the vacuumed bag is conducted by heat sealing. However, the sealing of the opening portion can be done by press-contacting, press-bonding or heating, instead of the heat sealing, by imparting adhesiveness or tackiness to the sealing portion of the opening portion of the bag.

Further, in a case where the sheet material and the plastic film are adequately press-bonded to each other simply by the treatment of vacuuming the bag, the sealing of the opening portion of the bag is not necessarily required. Likewise, the sealing of the opening portion of the bag is not necessarily required also in a case where the sheet material and the plastic film can adequately be press-bonded to each other by heating the bag while continuously vacuuming the bag.

The vacuum-packaged sheet material is, as packaged in the vacuum packaging bag, introduced into a heating chamber or passed through a heating zone for heating, or heated in the vacuum chamber so that the sheet material and the plastic film of the bag to be laminated, are securely press-bonded to each other. In some cases, after such heat treatment, the packaged heat material is introduced into an autoclave and subjected to heat-pressing, or without such heat treatment, the vacuum packaged sheet material is directly introduced into an autoclave and subjected to heat-pressing to press-bond the sheet material and the plastic film of the bag to be laminated.

The temperature condition for the above-mentioned heat treatment under atmospheric pressure in a heating chamber may vary depending upon the types of the plastic film and the adhesive interlayer or the adhesive used, and a suitable condition is selected depending upon such types. However, the temperature is usually within a range of from 60° to 160° C. For instance, when the plastic film is a thermosetting polyurethane provided with an adhesive layer, the temperature for the above-mentioned heat treatment is from 80° to 150° C., and when the plastic film comprises a thermoplastic polyurethane on the lamination side and a thermosetting urethane on the outer side, the temperature for the above-mentioned heat treatment is from 80° to 150° C. Likewise, when the plastic film is a polyethylene terephthalate provided with an adhesive interlayer, the temperature for the above-mentioned heat treatment is from 80° to 140° C. The heat treating time in the heating chamber is usually from 3 to 60 minutes. If necessary, after such heat treatment, heat press-bonding treatment may be conducted in an autoclave. In such a case, the treatment is conducted usually at a temperature of from 80° to 160° C. under a pressure of 2 to 10 kg/cm² for from 15 minutes to 2 hours in an autoclave. Further, when adequate bonding of the plastic film to the sheet material can be obtained by the vacuum deaeration treatment in the vacuum packaging bag without heat treatment in a heating chamber or in an autoclave, the above-mentioned heat treatment is unnecessary.

Of course, the operation for the lamination and press-bonding of the plastic film of the vacuum packaging bag to the sheet material in the vacuum chamber may be conducted simultaneously with respect to a plurality of laminates, or may be conducted continuously.

The illustrated vacuum chamber is defined by a closure 18 detachably mounted on a base plate 19 so that a sheet material may be introduced into the vacuum chamber. When the closure is closed on the base place, the hermetic sealing of the vacuum chamber is maintained by a packing 20. Various types of systems or mechanisms may be employed for the opening and closing of the vacuum chamber for the introduction of the sheet materials or the vacuum packaging bags containing the sheet materials into the vacuum chamber.

After the heat treatment in the heating chamber or after the heat-press treatment in the autoclave, the press-bonded laminate is taken out from the heating chamber or the autoclave, and cooled to room temperature, as the case requires. Then, the plastic film of the vacuum packaging bag attached to the sheet material is cut off along the outline of the sheet material to obtain a laminate comprising the sheet material and the plastic film bonded to each other. The plastic film may be cut exactly along the outline of the sheet material, or with a predetermined width left along the periphery of the sheet material, or may be cut to form plastic film trimmings at required portions or to form a plastic film blank portion along the periphery or the required portion of the sheet material.

Figure 9:
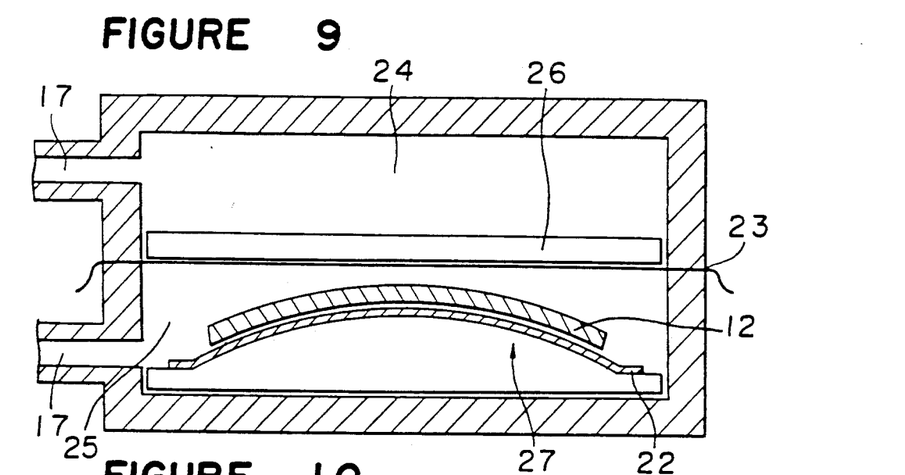
FIGS. 9 to 11 are cross-sectional views illustrating another embodiment of the present invention.
Figure 10:
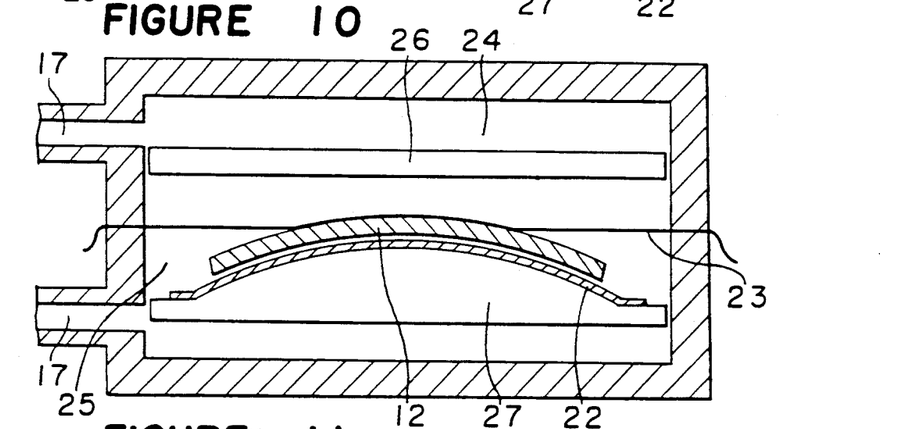
Figure 11:
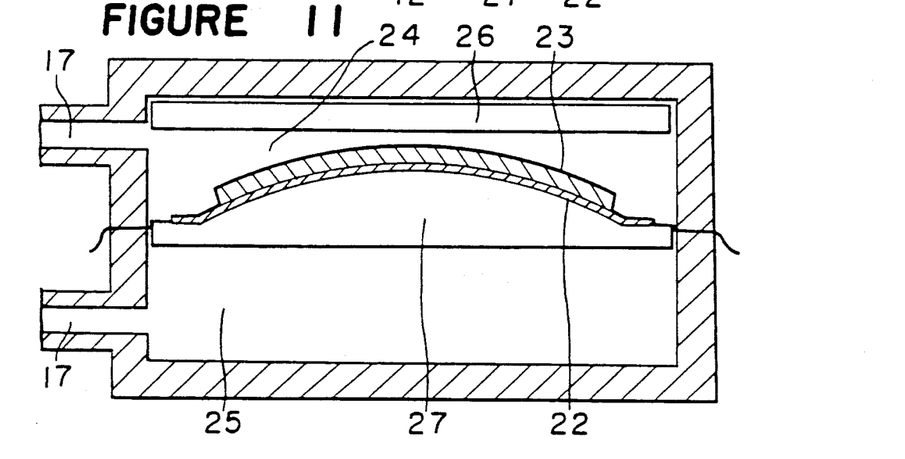

FIGS. 9 to 11 illustrate another embodiment of the present invention. As mentioned above, in the present invention, the vacuum packaging film material may be a pair of film sheets disposed in a vacuum chamber. At least one of the pair of film sheet is the plastic film to be laminated on the sheet material. In this case, the vacuum packaging is conducted by inserting the sheet material between the pair of film sheets, vacuuming the vacuum chamber to let the films enclose the sheet material and sealing the peripery of the films under the vacuumed condition to obtain a vacuum-packaged sheet material.

These Figures illustrate a case wherein a plastic film 22 is laminated on a glass sheet 12 by using a vacuum packaging film material comprising the plastic film 22 and another film 23. The plastic film 22 and the glass sheet 12 are placed on a support table 27 in the lower compartment 25 of the vacuum chamber, and another film 23 constitutes a partition wall dividing the vacuum chamber into the upper compartment 24 and the lower compartment 25. The upper compartment 24 and the lower compartment 25 are both vacuumed, and at least the film 23 is heated by a heating plate 26. When the vacuum level and the heating of the film 23 become adequate, the support table 27 is raised to press the plastic film 22 to the film 23 so that the periphery of the two films are sealed. When the vacuum condition is released, the glass sheet 12 is enclosed by the plastic film 22 and another film 23 in the vacuumed state. Further, when the plastic film 22 and the other film 23 are sealed, the vacuum condition in the upper vacuum compartment 24 is released first so that the other film 23 is pressed against the plastic film 22 for sealing, or this operation can be used in combination with the raising of the support table 27. When the other film 23 is flexible and sealable at room temperature, the heating is not necessarily required.

Now, the present invention will be described with reference to Examples. However, it should be understood that the present invention is by no means restricted to these specific Examples.

EXAMPLE 1

A plastic film having a three-layered structure comprising a self-healing thermosetting polyurethane layer (thickness: 0.8 mm) as the surface layer and an adhesive layer (thickness: 0.03 mm) to be bonded to a glass sheet and having the entire surface of said adhesive layer provided with embosses with a depth of 2 $\mu$m, and another film made of the same plastic film, were prepared. These two films were cut into a predetermined shape, and the peripheral portions were heat-sealed to obtain a vacuum packaging bag of an envelope type as shown in FIG. 8. This envelope type vacuum packaging bag was prepared so that the adhesive layers of the above-mentioned plastic films are located inside of the vacuum packaging bag. The size of the bag was 1500 mm in length and 850 mm in width.

The preparation of the bag was conducted in a dust-free chamber of class 1000, and the film was thoroughly cleaned by a suction type antistatic dust-removing apparatus before the preparation of the bag.

Into this vacuum packaging bag, a curved glass sheet of 1320×620×3 mm likewise thoroughly cleaned by dust-removing, was introduced, and the bag was evacuated at 10° C. to a vacuum level of about 0.5 mmHg. Then, the opening portion of the vacuum packaging bag was sealed by an impulse type heat-sealing machine. Thereafter, the bag was first introduced into a heating chamber with an atmosphere of 50° C., and gradually heated to 110° C. After the temperature of the glass sheet exceeded 107° C., the sealed bag was maintained for 10 minutes. Then, the bag was taken out from the heating chamber, and the plastic films were cut along the outline of the glass sheet 12 to obtain a safety glass laminate comprising the plastic films and the glass sheet. The safety glass thus obtained had excellent surface properties free from scars, irregularities or wrinkles and excellent transparency with a minimum see-through distortion, wherein the embosses of the plastic film were completely disappeared.

EXAMPLE 2

A vacuum packaging bag was prepared in the same manner as in Example 1 except that the depth of the embosses was changed to 1.5 $\mu$m and said another film was changed to a non-stretched nylon film. Into this vacuum packaging bag, a curved glass sheet of 1320×620×3 mm thoroughly cleaned and subjected to dust-removal, was inserted.

This bag was introduced into a vacuum chamber provided with a heat sealing apparatus, and the vacuum chamber and the vacuum packaging bag were evacuated to a vacuum level of about 2 mmHg. After the evacuation, the vacuumed bag was sealed by the heat sealing apparatus provided in the vacuum chamber, whereby the interior of the bag was maintained in the vacuumed condition even when the vacuum chamber was open to the atmosphere. The vacuum-packaged sheet material was further heated in a heating chamber with an atmosphere of 100° C. After the temperature of the glass sheet exceeded 97° C., the vacuum-packaged sheet material was maintained for 10 minutes, then taken out from the heating chamber and cooled. After cooling, the portion of the vacuum packaging bag not enclosing the glass sheet and said another film were removed to obtain a laminate having good transparency.

EXAMPLE 3

A plastic film having a double-layered structure comprising a self-healing thermosetting polyurethane layer (thickness: 0.4 mm) as the surface layer and an ethylene-vinyl acetate copolymer layer (thickness: 0.03 mm) as the adhesive layer to be bonded to a glass sheet and having the entire surface of said adhesive layer provided with embosses with a depth of 2 $\mu$m, and another film made of a polyethylene film (thickness: 125 $\mu$m) were prepared. These two films were cut into a predetermined shape, and the peripheral portions were heat-sealed to obtain a vacuum packaging bag of an envelope type as shown in FIG. 8. This envelope type vacuum packaging bag was prepared so that one side was made of the plastic film 22 of the above-mentioned double-layered structure, the other side was made of the polyethylene film 23, and the adhesive layer of the plastic film was located inside the vacuum packaging bag. The size of the bag was 1500 mm in length and 850 mm in width.

The preparation of the bag was conducted in a dust-free chamber of class 1000, and the film was thoroughly cleaned by a suction type antistatic dust-removing machine before the preparation of the bag. Into this vacuum packaging bag, a curved glass sheet of 1320×620×3 mm likewise thoroughly cleaned for dust-removing, was introduced, and the bag was evacuated in an atmosphere of 20° C. to a vacuum level of about 1.0 mmHg. Then, the opening portion of this vacuum packaging bag was sealed by an impulse type heat sealing machine. Thereafter, the sealed bag was introduced firstly into a heating chamber with an atmosphere of 50° C., gradually heated to 105° C. and maintained for 10 minutes. Then, the vacuum packaging bag was taken out from the heating chamber, and the plastic film was cut off along the outline of the glass sheet 12 to obtain a safety glass laminate comprising the plastic film and the glass sheet. The safety glass thus obtained had excellent surface properties free from scars, irregularities or wrinkles and good transparency with a minimum see-through distortion, wherein the embosses of the plastic film were completely disappeared.

EXAMPLE 4

A plastic film having a double-layered structure comprising a polyethylene terephthalate film treated for surface hardening (thickness: 125 $\mu$m) as the surface layer, and a polyvinyl butyral layer (thickness: 0.36 mm) as the adhesive interlayer and having the entire surface of said adhesive layer provided with embosses with a depth of 5 $\mu$m, and another film having a double-layered structure comprising a nylon layer and a polyethylene layer, were prepared. The two films were cut into a predetermined shape, and the peripheral portions were heat-sealed so that the polyvinyl butyral layer and the polyethylene layer were located inside, whereby a vacuum packaging bag of an envelope type was obtained. This envelope type vacuum packaging bag was prepared so that one side was made of the plastic film 22 of the above-mentioned double-layered structure and the other side was made of said another film 23 of the double layered structure, and the adhesive layer of said plastic film was located inside the vacuum packaging bag. The size was 1500 mm in length and 850 mm in width.

The preparation of the bag was conducted in a dust-free chamber of class 1000, and the film was thoroughly cleaned by a suction type antistatic dust-removing machine before the preparation of the bag.

Into this vacuum packaging bag, a curved glass sheet of 1320×620×3 mm likewise thoroughly cleaned for dust-removing, was inserted. This bag was introduced into a vacuum chamber provided with a heat sealing apparatus as shown in FIG. 6, and the vacuum chamber and the vacuum packaging bag were evacuated to a vacuum level of about 2 mmHg. After the evacuation, the vacuumed bag was sealed by the heat sealing apparatus provided in the vacuum chamber. Thereafter, the sealed bag was introduced firstly into a heating chamber with an atmosphere of 60° C., gradually heated to 110° C., and held for 15 minutes. Then, the vacuum packaging bag was taken out from the heating chamber, and the plastic film was cut off along the outline of the glass sheet 12 to obtain a safety glass laminate comprising the plastic film and the glass sheet. The safety glass thus obtained had excellent surface properties free from scars, irregularities or wrinkles and having excellent transparency with a minimum see-through distortion, wherein the embosses of the plastic film were completely disappeared.

COMPARATIVE EXAMPLE 1

Into a vacuum packaging bag made of a smooth surfaced silicone rubber sheet having a thickness of 2 mm, a laminated assembly of the plastic film and the glass sheet (each having a size of 300×300 mm) as described in Example 1, was inserted. In the same manner as in Example 1, the film and the glass were thoroughly cleaned for dust-removing. Further, the vacuum packaging bag was also cleaned to remove dusts.

The vacuum packaging bag was vacuumed, and the entire bag was heated to 100° C. and held for 10 minutes. After cooling, the laminate was taken out, whereby the surface was roughened due to dusts present between the silicone rubber sheet and the plastic film bonded to the glass sheet.

COMPARATIVE EXAMPLE 2

A release-treated glass obtained by baking treatment with polymethyl siloxane at 330° C., was laminated on the thermosetting polyurethane side of the plastic film as disclosed in Example 1, and likewise a cleaned glass sheet was laminated on the low thermoplastic polyurethane side, in a dust-free chamber of class 1000. The size of each of the plastic film and the glass sheet was 200×200 mm.

The laminated assembly was inserted into a vacuum packaging bag, and the bag was vacuumed, and then introduced into a autoclave. It was maintained at 130° C. in an atmosphere of 10 kg/cm$^2$ for 20 minutes. Then, the pressure was released and the press-bonded laminate was cooled.

When the release-treated glass was taken off from the press-bonded laminate, some dents due to dusts trapped at the interface between the released-treated glass and the film were partially observed.

EXAMPLE 5

A plastic film comprising a self-healing thermosetting urethane layer of 700×500×0.8 mm and an adhesive layer having a thickness of 0.03 mm, and another film of a rolled non-stretched nylon film having a thickness of 0.05 mm, were thoroughly cleaned for dust-removing in a dust-free chamber of class 1000.

On the other hand, a curved glass of 441×337×3.0 mm with a depth of curvature of 28 mm was thoroughly washed and cleaned for dust-removing.

Referring to FIGS. 9 to 11, said another film 23 was used as a partition wall dividing the vacuum chamber into an upper compartment 24 and a lower compartment 25. The plastic film 22 and the glass sheet i.e. the sheet material 12 were placed on a support table 27 provided in the lower compartment 25. The upper and lower compartments were simultaneously vacuumed to a level of 2 mmHg, and at the same time said another film 23 was heated by a heating plate 26 provided in the upper compartment 24 and pre-heated to a temperature of 180° C.

After evacuation by vacuuming, the heating plate 26 was raised, and at the same time the support table 27 in the lower compartment 25 was raised, whereby the periphery of the plastic film 22 was sealed to the heated another film. Then, the vacuum in the upper and lower compartments was released to obtain a vacuumed bag containing the glass sheet. The above operation was conducted in a dust-free atmosphere of class 1000.

The vacuumed bag was then introduced into a heating chamber with an atmosphere of 100° C., and maintained for 10 minutes after the temperature of the glass sheet exceeded 97° C. Then, the vacuumed bag was taken out and cooled. After the cooling, the portion of the bag not enclosing the glass sheet and said another film were removed to obtain a laminate having excellent transparency.

As described in the foregoing, according to the present invention, for the production of a laminate comprising a sheet material and a plastic film laminated thereon, a part or whole of a vacuum packaging film material used for the press-bonding is made from a film constituting the plastic film of the laminate, whereby the laminate can efficiently be produced by vacuum packaging the sheet material with the vacuum packaging film material, followed by press-bonding of the plastic film to the sheet material and the removal of the portion of the vacuum packaging film material not constituting the laminated plastic film. Since at least a part of the vacuum packaging film material serves as the plastic film to be laminated on the sheet material, the cost for the material can be reduced. A vacuum packing bag of the present invention can readily be prepared from a plastic film to be laminated, or from such a plastic film and another film, by a simple means such as heat sealing, and the production cost can be reduced as compared with the conventional rubber bag for preliminary press-bonding.

Further, according to the present invention, the preliminary press-bonding can simply be conducted in a short period of time without any special heating i.e. simply by vacuum packaging the sheet material with the vacuum packaging film material. Further, the final press-bonding can simply be made by heating the preliminarily press-bonded laminate in a heating chamber under atmospheric pressure or by heat-pressing it in an autoclave. Thus, the process for the final press-bonding can be simplified, and there is an additional advantage that the production time can be shortened. Furthermore, the vacuum packaging film material is thin and light, and thus provides an advantage for energy saving in the heat treatment. In the conventional preliminary press-bonding method wherein a rubber bag for preliminary press-bonding or nip rolls are employed, by the structural nature of the rubber bag or the nip rolls, the wrinkles of the rubber bag or the irregularities, scars or scratch marks are likely to be transferred to the plastic film of the laminate during the preliminary press-bonding of the laminate, resulting in a laminate having defective surface properties. Whereas, according to the present invention, there is no member which transfers the above-mentioned defects onto the surface of the plastic film during the press-bonding of the plastic film to the sheet material, and it is possible to obtain a laminate with a plastic film surface having good surface properties. According to the present invention, the wrinkles, irregularities or optical distortion of the plastic film surface can substantially be minimized over the conventional methods, and thus the process of the present invention is most suitable for the production of a safety glass for which surface properties of high quality are required, such as a safety glass wherein a plastic film is laminated on the interior side of a single glass sheet or a laminated glass sheet for windows of automobiles and other various transportion vehicles or aircrafts, to provide breaking resistance or damage resistance to prevent the damages to the skin of the passenger at the time of the breakage of the glass sheet, and in some cases, to provide penetration resistance.

In the present invention, the vacuum packaging film material can be applied to various shapes and structures, and the process of the present invention is applicable for the production of laminates having complicated curvatures, where the conventional rubber bag is hardly applicable.

We claim:

1. A process for producing a laminate comprising a sheet layer and a plastic film laminated on at least one side of the sheet layer, which comprises vacuum-packaging the sheet layer by a vacuum packaging film material by disposing the sheet layer in laminatable relationship between two sheets of film material whose peripheries are brought into superimposed contact in the process, the two sheets forming the two sides of a package containing the sheet layer when the peripheries are sealed to each other, and hermetically sealing the peripheries to each other so that a vacuum may be sustained within the hermetically closed package so formed after the vacuum has been created therein, at least the final sealing occurring after evacuation of the space between the two sheets of film material between which the sheet layer is disposed, of which package at least the sheet of film material corresponding to said side of the sheet layer is made of a plastic film to be laminated on the sheet layer, press-bonding the plastic film to the sheet layer, at least the final press bonding occurring after the final sealing forming the hermetically closed package, and removing the film material from the sheet layer except for the plastic film portion laminated on the sheet layer, wherein the vacuum packaging film material is a pair of film sheets not attached to one another disposed in a vacuum chamber, and wherein one of the two film sheets is the plastic film to be laminated on the sheet layer and the other is a film other than the plastic film, the other film is disposed to divide the vacuum chamber into two compartments, the sheet layer is inserted between the plastic film and the other film in one compartment, the entire vacuum chamber is then vacuumed, the two films are then brought close together to enclose the sheet layer and the periphery of the films is sealed under the vacuumed condition to obtain a vacuum-package sheet material, and after the press-bonding of the plastic film to the sheet layer the periphery of the plastic film is cut off along the outline of the sheet layer.

2. The process for producing a laminate according to claim 1, wherein the enclosing and sealing operations are conducted by releasing the other compartment from the vacuumed condition, while maintaining the vacuumed condition of the first compartment in which the sheet layer and plastic film are located.

3. The process for producing a laminate according to claim 1, wherein the sealing operation is conducted by heat-sealing the other film to the plastic film.

4. The process for producing a laminate accoring to claim 1, wherein a support table is located in the vacuum chamber, the plastic film to be laminated to the sheet layer is placed on the support table and the sheet layer is placed on the plastic film, and the support table is moved towards the other film to enclose the sheet material with the two films, followed by the sealing of the periphery of the films.

* * * * *